(No Model.)

W. L. & C. BROWN.
AMALGAMATOR.

No. 572,353.  Patented Dec. 1, 1896.

Witnesses:

Inventors,
Wilfred L. Brown
Calvin Brown
By Dewey & Co.
Atty.

UNITED STATES PATENT OFFICE.

WILFRED L. BROWN AND CALVIN BROWN, OF SAN FRANCISCO, CALIFORNIA, ASSIGNORS, BY DIRECT AND MESNE ASSIGNMENTS, OF ONE-HALF TO LEON ST. D. ROYLANCE AND CHARLES A. W. WAGNER, OF SAME PLACE.

AMALGAMATOR.

SPECIFICATION forming part of Letters Patent No. 572,353, dated December 1, 1896.

Application filed February 27, 1895. Renewed November 25, 1895. Serial No. 570,123. (No model.)

*To all whom it may concern:*

Be it known that we, WILFRED LANGDON BROWN and CALVIN BROWN, citizens of the United States, residing in the city and county of San Francisco, State of California, have invented an Improvement in Amalgamators; and we hereby declare the following to be a full, clear, and exact description of the same.

Our invention consists of an amalgamating apparatus for recovering and saving the precious metals contained in ores.

The objects of our invention are, first, to provide means whereby the ores after being properly pulverized and immersed in the solution placed in the tank, thus constituting a pulpy or fluid mass, may be given a rotary or circulating motion by the action of the exhausting and discharging device and thus made to impinge upon the amalgamating-plates in the tank, thus bringing in contact therewith such particles of the metals in the ore as will adhere thereto; second, to afford means by the application to the fluid or pulpy mass, when it shall be composed of rebellious instead of free-milling ores, of electricity and certain reducing chemicals that may be found efficient for rendering the solution operative upon the ores for the disintegration and separation of the base substances in combination with the precious metals, thus freeing the latter from their combination with these contaminating substances and rendering them susceptible to amalgamation. We obtain these results by the apparatus illustrated in the accompanying drawings, in which—

Figure 1:
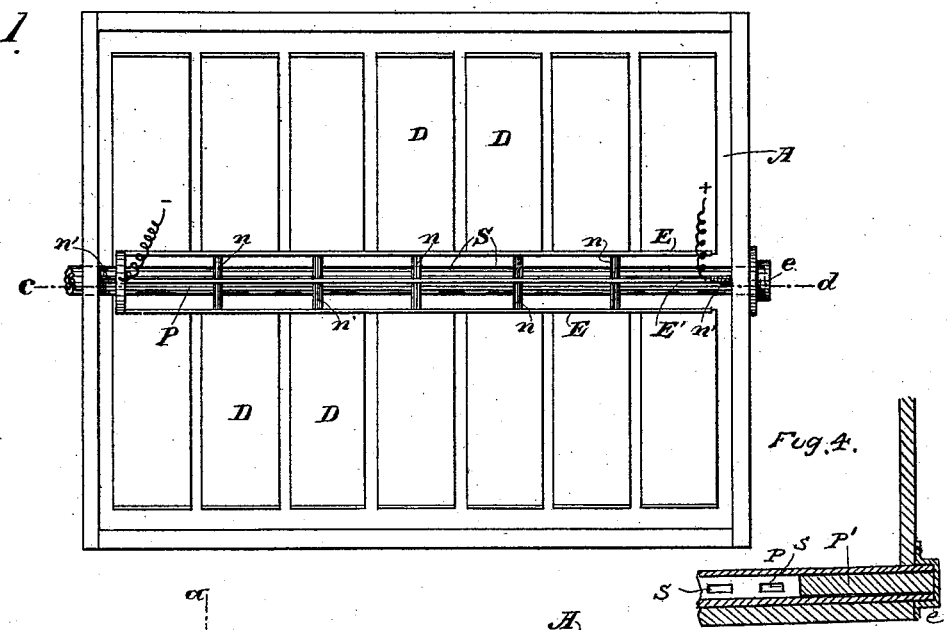
Figure 4:
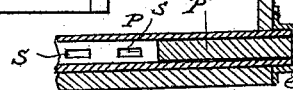
Figure 3:
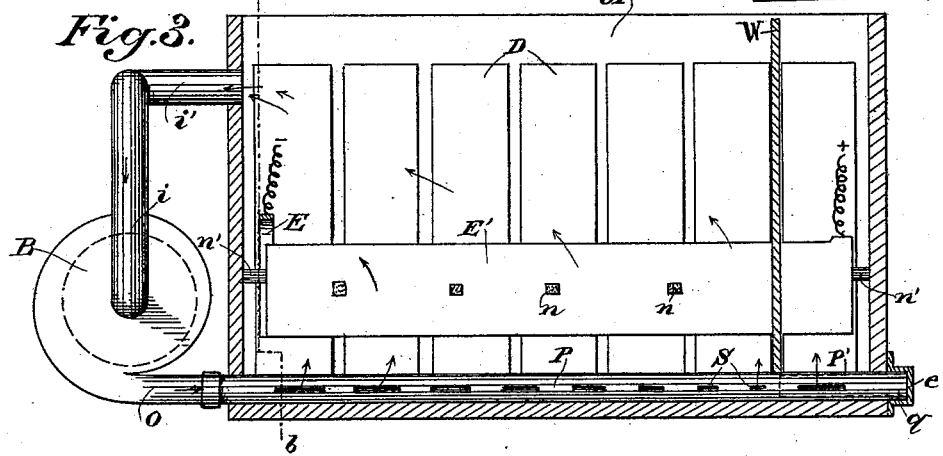
Figure 2:
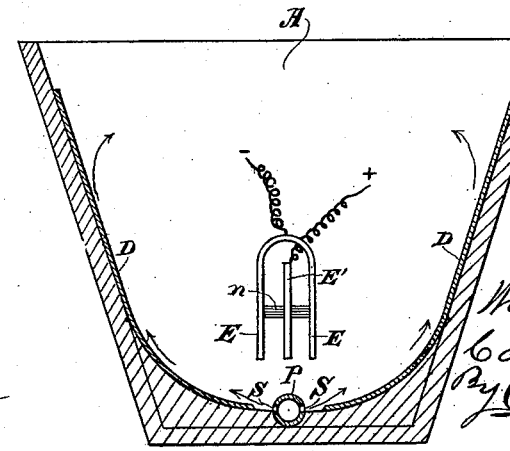

Figure 1 is a plan of the entire apparatus. Fig. 2 is a vertical transverse section on the line $a\,b$ of Fig. 1, and Fig. 3 is a vertical longitudinal section through the middle of the line $c\,d$ of Fig. 1.

Similar letters refer to similar parts throughout the several views.

The tank A constitutes a receptacle for the pulverized ore to be treated. It is preferably made of a prismoidal shape with sloping sides, which, upon the interior, are formed into tangentially-curved surfaces terminating near the middle of the bottom of the tank. The ends of the tank may be made vertical. This tank may be provided with adjustable transverse partitions in case any portion less than its whole length may be required for use.

A pipe P, pierced with a succession of slits S S, or instead of slits a suitable number of holes placed opposite the sides of the tank, is laid in a longitudinal groove in the bottom thereof and through its middle at the lower termination of the curves of its sides, so that jets of fluid coming through the slits or holes from the interior may strike directly upon the amalgamating-plates D D D, placed upon the curved sides of the tank. The orifices, slits, or holes in the pipe are gradually diminished in area from the pump end to its farther end, to facilitate uniform action of circulation of the fluid contents in the tank.

The pipe P passes through the ends of the tank, and at one end is provided with a coupling for attachment to the discharge end of the exhausting and discharging apparatus and at the other or opposite end with means for attachment of the cap $e$. The pipe P is fitted with a piston P' for the purpose of shortening the flow of fluid through it, when a less division than the whole length of the tank is used. Instead of this pipe P, constructed as shown, we may use any other suitable form of discharge-pipe or discharging apparatus for permitting a fluid discharge therefrom upon the amalgamating-surface.

B is an exhausting and discharging device, here represented as a centrifugal pump attached to one end of the tank, having its discharge-outlet O connected with the pipe P and its inlet $i'$ connected with and entering the tank at a point near the top.

The movable amalgamating-plates D D D, made to accurately conform to the curved surfaces of the sides of the tank, are provided in a succession of opposite pairs extending the whole length of the tank, their lower edges being placed near the pipe P and on the level of the lower edges of the slits or holes in said pipe P. Instead of this arrangement of amalgamating-plates any other suitable arrangement may be used whereby an amalgamating-surface is provided in the tank.

Electrodes E E E' are placed longitudinally in the tank directly over the pipe P and separated therefrom, E E being the negative and E' the positive electrodes, the positive electrodes being disposed between the negative electrodes E E. These electrodes may be of any proper material, but preferably of cast-iron, and are kept parallel by insulating-stops $n \ n \ n$. They are suspended at their ends and made adjustable in their position, so as to be lowered or raised whenever desired by means of their supports $n' \ n'$. While this construction and arrangement of the electrodes is deemed to be an efficient one, we do not limit ourselves thereto, but may use any other suitable arrangement.

When a less portion than a whole of the tank is used, shorter electrodes may be applied.

The operation of the apparatus is as follows: When it is used for free-milling ores susceptible of direct amalgamation, said ores, in a properly-pulverized condition mixed with a sufficient quantity of water to render the fluid mass amenable to the action of the pump, are placed in the tank, so that a circulation of the fluid mass may be obtained. The pump is then set in operation, and, acting upon the liquid charge through the perforated pipe P, causes the mass to circulate in the direction of the arrows shown in Fig. 3, carrying its solid particles repeatedly against the amalgamating-plates, upon which will be received such metals contained in the charge as will amalgamate thereon. When rebellious ores are to be treated, a suitable electrolyte is introduced into the tank, which electrolyte, being acted upon by the electric current through the electrodes connected with the source of electric energy, becomes decomposed and thus supplies the reagents necessary for the decomposition of the base matters found in the ores, and the more valuable metals, being thus freed, will amalgamate on the plates. In case of both free-milling and rebellious ores the circulation in the tank is kept up as long as may be necessary for the extraction and amalgamation of the precious metals. An indication of the completion of the operation is shown by an inspection of the amalgamating-plates, any one or number of which may be removed during the action of the apparatus, their surfaces cleared of amalgam, and the plates returned to the tank for a fresh coating, if the circulating charge be capable of a further deposit. If no more amalgam is deposited, it is a sign of the completion of the operation. The exhausted charge may then be drawn off from the tank through the outlet $q'$ of the pipe P and a fresh charge of pulverized ore introduced for treatment.

The circulating force from the action of the pump through the graduated orifices in the pipe P being more intense at the bottom of the fluid charge under treatment and diminishing upward carries to the surface comparatively few particles of the pulverized ore, and the inlet-pipe $i'$ of the pump being below the fluid surface enables the pump to be constantly filled with the clear portion thereof and to be thus freed from the wear to which it may be exposed by the abrasion of the heavier and more numerous particles of ore being treated. In this operation only a small portion of the fluid passes through the pump, that portion being sufficient to maintain the circulation in the tank without exterior supply.

In ordinary amalgamating processes by the use of amalgamating-plates as practiced in the extraction of valuable metals from their ores the pulp containing them is made to flow from the pulverizing battery or mill over a succession of plates, the particles being carried along by a current of water.

Experience shows that in this method a considerable and important portion of the lighter and finer floating particles of the precious metal being thus suspended in the water-current does not come in contact with the plates, however long they may be extended, and consequently is carried off and lost unless further and expensive means are used for its recovery. In contrast with this ordinary and imperfect method of saving precious metals our invention, by the application of a circulating motion to a pulpy mass in the tank and the use of a comparatively small surface of amalgamating-plates, more completely secures the saving of such metals, for instead of the pulp simply gliding over the plates the lighter particles of the precious metals, being suspended in the water and thus exposed to more chances of contact with them and of adhering thereto, are repeatedly and with an impinging force thrown toward and, finally, by the proper continuation of the circulating action, against them and saved in the amalgum instead of being floated away beyond recovery.

We do not herein claim the process described in the foregoing application for treating rebellious ores by means of electricity and chemicals, that being the sole invention of Wilfred Langdon Brown and reserved as the subject-matter for another application executed the same day as this application.

Having thus described our invention, what we claim as new, and desire to secure by Letters Patent, is—

1. In an amalgamator, a tank or receptacle having curved sides and amalgamating-plates fitted thereto, a pipe extending along the bottom between the sides with openings so disposed as to direct a fluid discharge therefrom against the concave surface of the amalgamating-plates, and an exhausting and discharging device having its discharge connected with said pipe and its exhaust connected with the interior of the tank near the top below the surface of its contents, whereby a continuous circulation is maintained.

2. In an amalgamator, a tank or receptacle having inclined sides and vertical ends, a pipe extending axially along the bottom with perforations therein so disposed as to discharge against the sides and a pump with an inlet connected with the upper part of the tank and an outlet connected with the perforated pipe to cause a circulation of the fluid contents, transversely-adjustable partitions by which the area of the tank is enlarged or diminished and removable amalgamating-plates fitted to the sides of the tank essentially tangential to or at an angle with the discharge-opening of the pipe.

3. In an amalgamator, a tank or receptacle having inclined sides and vertical ends, a pipe extending axially along the bottom with perforations so disposed as to discharge against the sides, and a pump with an inlet connected with the upper part of the tank and an outlet connected with the perforated pipe to cause a circulation of the fluid contents, transversely-adjustable partitions by which the area of the tank is enlarged or diminished, and removable amalgamating-plates fitted to the sides of the tank essentially tangential to or at an angle with the discharge-opening of the pipe, and a plunger movable within the pipe whereby its length is adjusted to correspond with the length of the tank and the position of the transverse partitions.

4. In an amalgamator, a tank in which the pulp and water circulate, amalgamating-plates arranged in said tank, a pipe on or near the bottom of the tank having perforations in its sides which increase in area from the inlet to the opposite end, and an exhausting and discharging device, whereby the fluid contents of the tank are continuously circulated from the upper part through the perforated pipe and thrown against the amalgamating-plates.

5. In an amalgamator, the combination of a tank or chamber having curved sides, curved amalgamating-plates fitted to said sides, a pipe extending axially between the lower edges of the plates and having perforations adapted to discharge jets substantially parallel with the curve of the lower portions of the plates whereby the particles impinge against the curved amalgamating-surfaces with a continuous pressure upward and outward from the point of initial contact therewith, an exhausting and discharging device having its inlet connected with the tank near the surface of its fluid contents and its outlet connected with the perforated pipe, and a stop-cock at the end of the pipe opposite to said device whereby the contents of the same may be discharged.

6. An amalgamator comprising a tank in which the pulp and water circulate, a curved amalgamating-surface within said tank, electrodes within said tank adapted to be connected with a source of electric energy, an exhausting and discharging device having its exhaust-pipe connected with the upper part of the tank and its discharge-pipe extending into and located on or near the bottom of the tank, whereby a continuous circulation of the fluid contents of the tank over the electrodes and against the concaved amalgamating-surface is maintained.

7. In an amalgamator, a tank or receptacle having curved sides and amalgamating-plates attached thereto, a perforated pipe extending axially along the bottom of the tank, an exhausting and discharging device connected with the tank and the pipe so as to circulate the fluid contents of the same continuously through the pipe and discharge the pulp against the concave surface of the amalgamating-plates, electrodes suspended above the pipe within the tank and wires by which said electrodes are connected with a source of electric energy.

8. In an amalgamator, a tank or chamber having curved sides and vertical ends, amalgamating-plates fixed upon said sides, a pipe having longitudinal slits made in its sides to discharge the pulp at an angle against the amalgamated plates, and a pump or device by which the fluid contents of the tank are continuously circulated from the upper part through the pipe, said slits being made with an increasing area from the inlet to the opposite end of the pipe.

9. In an amalgamator, a tank or chamber with curved sides and curved amalgamating-plates fitted to the sides, a pipe extending axially between the lower edges of the plates, having slits or openings discharging at angles against the surfaces of the plates, a pump or circulating device with an inlet connecting it with the tank near the surface of its contents, and an outlet connected with the perforated pipe, so as to cause the contents to continually impinge against the amalgamating-surfaces, and a discharge-opening in the end of the pipe opposite to the pump whereby the contents of the tank are discharged.

In witness whereof we have hereunto set our hands.

WILFRED L. BROWN.
CALVIN BROWN.

Witnesses:
S. H. NOURSE,
GEO. H. STRONG.